United States Patent [19]
Kuhlmann et al.

[11] 3,933,716
[45] Jan. 20, 1976

[54] AQUEOUS DISPERSIONS OF VINYLESTER/ETHYLENE/ETHYLENICALLY UNSATURATED SULFONIC ACID OR DERIVATIVE THEREOF COPOLYMERS

[75] Inventors: Dieter Kuhlmann, Cologne; Herbert Bartl, Odenthal-Hahnenberg, both of Germany

[73] Assignee: Bayer Aktiengesellschaft, Germany

[22] Filed: Oct. 9, 1973

[21] Appl. No.: 404,664

[30] Foreign Application Priority Data
Oct. 14, 1972 Germany............................ 2250517

[52] U.S. Cl...................... 260/29.6 TA; 260/17 A; 260/29.6 WA; 260/29.7 H; 428/523
[51] Int. Cl.² ......................................... C08L 41/00
[58] Field of Search .. 260/29.6 TA, 29.6 R, 29.6 H, 260/79.3 MU

[56] References Cited
UNITED STATES PATENTS
3,547,899  12/1970  Arlt et al..................... 260/79.3 MU
3,637,432  1/1972  Gibbs et al. ................. 260/29.6 TA
3,817,896  6/1974  Bergmeister et al. ........ 260/29.6 TA

*Primary Examiner*—Harold D. Anderson
*Attorney, Agent, or Firm*—Connolly and Hutz

[57] ABSTRACT

Polymer dispersions having solids contents of from 45 to 65% by weight are continuously produced by copolymerizing a vinyl ester, ethylene and (meth)acrylamidoalkyl sulphonic acid or (meth)acryloyloxyalkyl sulphonic acid or ammonium or alkali salt thereof under an ethylene pressure of from 5 to 120 atms, at a temperature of from 0° to 60°C in the presence of an anionic emulsifier and with the aid of a free radical forming agent.

The polymer dispersions are suitable as pigment binders.

3 Claims, No Drawings

AQUEOUS DISPERSIONS OF VINYLESTER/ETHYLENE/ETHYLENICALLY UNSATURATED SULFONIC ACID OR DERIVATIVE THEREOF COPOLYMERS result The invention relates to the continuous production of aqueous dispersions of vinylacetate/ethylene polymers.

It is known that vinyl esters of saturated carboxylic acids with from 2 to 18 carbon atoms in the acid component can be emulsion-polymerised in batches at elevated pressure in the presence of ethylene to form aqueous dispersions of vinyl ester/ethylene polymers. It is possible in this way to obtain dispersions differing with respect to the analytical composition of the polymer formed, depending upon the ethylene pressure and the other reaction conditions.

In the absence of external plasticisers, polymer dispersions of this kind, following removal of the water by evaporation at temperatures of from 0° to 15°C, generally form coherent films only when the glass transition temperature $T_g$ of the copolymer is also in the range of from 0° to 15°C. Increasing quantities of ethylene in the polymer result in an increasing reduction in the glass transition temperature $T_g$ in relation to the vinyl ester homopolymer, so that, for example in the case of a polymer film obtained from a dispersions of a vinylacetate/ethylene polymer containing 50 % by weight of ethylene by evaporating off the water, the result is a glass transition temperature $T_g$ of approximately $-25°C$ in contrast to a glass transition temperature $T_g$ of approximately $+30°C$ for homopolyvinylacetate.

Conventional processes for producing polymer dispersions of this kind have generally been batch processes which can be regarded as laboratory processes, i.e. they are not suitable for working on an industrial scale. The principal disadvantages attending processes such as these are as follows:

1. Before each new batch is introduced, the reactor has to be rinsed and cleaned, at least with water, but generally with solvents and thereafter with water, and then some of the aqueous phase and monomers are introduced in a time-consuming operation.

2. With each batch, the quantity of ethylene required has to be introduced under pressure in the shortest possible time for economic reasons, which necessitates the use of high-output compressors.

3. Thereafter, the contents of the reactor have to be heated to the working temperature in a time-consuming operation.

4. On completion of polymerisation, the entire reactor, which is under elevated presure, has to be vented as quickly as possible, if necessary after preliminary cooling. This operation is accompanied by the accumulation of large quantities of ethylene which had been previously dissolved or absorbed under elevated pressure in the polymer dispersion formed so that, when the reactor is vented, the dispersion is foamed to several times its liquid volume on leaving the reactor. The generally stable foam formed has to be collected in large blow tanks where it is allowed to collapse and settle. The liquid residues left in the reactor after (1.) then have to be removed from the wall of the reactor because copolymer skins affecting, to a considerable extent the transfer of heat on the reactor wall would otherwise be formed following evaporation of the water.

5. In many cases, the shear forces which, in the event of rapid venting, seriously affect the latex through the small-diameter tubes and valves normally used in the construction of pressure reactors give rise to considerable coagulate formation, in addition to which more or less finely divided coagulate (specks) are formed when the foam bubbles which are formed during venting of the dispersion burst.

For example, it was proposed in U.S. Pat. No. 3,547,899 that dispersions of vinyl monomer/ethylene polymers be produced by a batch process using 2-N-(meth)-acrylamido-2methyl propane sulphonic acid in the presence of catalysts which form free radicals a buffer system and, optionally, emulsifiers. A dispersion of a vinyl chloride/ethylene polymer produced in accordance with Example 4 of U.S. Pat. No. 3,547,899 has a total solids content of 24.1 % by weight. Dispersions with polymer contents as low as these, even if they are sufficiently stable, can only be used as pigment binders after they have been concentrated by evaporation or like processes to a total solids content of from 45 to 65 % by weight.

In addition, attempts to produce the vinyl ester/ethylene polymer dispersions with total solids contents of from 45 to 65 % by weight in batches using emulsifiers, buffer substances, catalysts which form free radicals and the sulphonic acids mentioned in U.S. Pat. Nos. 3,024,221, 2,964,557 and 3,547,899, or the corresponding ammonium or alkali salts, have shown that this process, in addition to the disadvantages referred to above, is unsuitable for batch production for the following reasons:

1. The electrolyte-incompatible dispersions obtained show inadequate pigment compatibility.

2. The dispersions are not stable in storage and "cream up" when left standing. The reason for this is that the sulphonic acids or their salts used in batch production are not incorporated in the required manner into the water-insoluble vinyl ester/ethylene polymer formed, but instead a water-soluble polymer containing hydrophilic groups which acts as a creaming agent is formed under the reaction conditions.

3. Attempts to promote incorporation of the sulphonic acids or their salts corresponding to the general formula (1):

in which
R is a hydrogen atom or methyl radical;
X represents an —O—, —NH— or

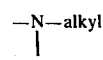

group;
Me is an alkali metal or ammonium radical and
Y is an alkylene radical,
into the water-insoluble vinyl ester/ethylene polymer formed through the absence of emulsifiers during batch production, have shown that, in addition to the disadvantages mentioned under (1) and (2), large quantities of coagulate are also formed.

Accordingly, attempts to produce dispersions of vinyl ester/ethylene polymers continuously using sulphonic acids of the aforementioned type or their salts had also been expected to result in the formation of dispersions which have inadequate stability in storage ("spontaneous creaming") and which, in addition, would not be suitable for use as pigment binders on account for their incompatibility with pigments.

However, it has surprisingly been found that vinyl ester/ethylene polymers, obtained by the continuous production of concentrated dispersions of vinyl ester-/ethylene polymers with total solids contents of from 45 to 65 % by weight, show outstanding resistance to electrolytes and shear forces and are suitable for use as versatile pigment binders by virtue of their outstanding compatibility with pigments.

Accordingly, the invention relates to a process for the continuous production of polymer dispersions comprising ethylene, a vinyl ester and, optionally, other comonomers with total solids contents of from 45 to 65 % by weight, and to their use as pigment binders.

According to the invention, the polymer dispersions can be prepared by introducing ethylene, vinyl ester and an aqueous phase which, in addition to a catalyst, buffer and activator system, contains from 0.1 to 15 % by weight, based on the weight of water used, of a water-soluble sulphonic acid compound corresponding to general formula (1) in which X represents an —O—, —NH— or —N—alkyl group;
Y represents a linear or branched alkylene radical with from 2 to 10 carbon atoms; and
Me is an ammonium or alkali metal radical, into a reaction system which is under an ethylene pressure of from 5 to 120 atms. of ethylene. The ethylene pressure may be maintained by tempering at a reaction temperature suitable for carrying out the continuous polymerization reaction, and the aqueous polymer dispersion formed is preferably simultaneously removed from the system together with the unreacted dissolved or gaseous monomers. The ethylene and vinyl ester may be reacted together with another comonomer.

Some of the sulphonic acid compounds are known from U.S. Pat. Nos. 3,547,899, 3,024,221 and 2,964,557 and can be produced by processes similar to those described in these U.S. Patent Specifications. They are preferably added in a quantity of from 0.5 to 5% by weight, based on the weight of the water used.

Alkyl of

groups represents linear and/or branched alkyl radicals with up to 6 carbon atoms such as, for example, methyl, ethyl, propyl, isopropyl, butyl, isobutyl, pentyl, isopentyl, hexyl and isohexyl.

Ethylene, propylene, isopropylene, butylene, isobutylene, pentylene, isopentylene, hexylene, isohexylene, heptylene, isoheptylene, octylene, isooctylene, nonylene, isononylene, decylene and isodecylene are mentioned as linear or branched alkylene groups with from 2 to 10 carbon atoms.

It is preferred to use ammonium or alkali salts of 2-N-acrylamido-2-methyl propane sulphonic acid or corresponding salts of 2-N-methacrylamido-2-methyl propane sulphonic acid.

The ratio by weight of vinyl ester to ethylene is preferably from 100:2 to 100:250 and particularly from 100:10 to 100:110, and the ratio by weight of vinyl ester to aqueous phase is preferably from 3:1 to 0.3:1, particularly from 2:1 to 0.45:1. It is possible in this way to obtain polymer dispersions with a total solids content of from 45 to 65 % by weight, preferably from 50 to 65 % by weight, the polymer containing from 4 to 55 % by weight and preferably from 10 to 45 % by weight of polymerised ethylene, from 30 to 95.9 % by weight, preferably from 50 to 89.5 % by weight, of polymerised vinyl ester and from 0.1 to 15 % by weight, preferably from 0.5 to 5 % by weight, of sulphonate corresponding to formula (1).

Vinyl acetate is preferably used as the vinyl ester in the process according to the invention, although it is also possible to use other vinyl esters with from 3 to 18 carbon atoms in the acid component as well, such as vinyl propionate, vinyl laurate or vinyl stearate, or a mixture of different vinyl esters, without in any way affecting the stability level of the resulting dispersions which is characteristic of the process. It is also possible to use other monomers such as acrylic or methacrylic acid esters with from 1 to 8 carbon atoms in the alcohol component, or vinyl halides such as, for example, vinylchloride or vinylidene chloride, in quantities of up to 50 % by weight, based on the weight of the quantity of vinyl ester specified above, without any adverse effect upon the stability of the dispersions obtained by the process according to the invention.

It is also possible to use reactive crosslinking agents such as vinyl esters of polybasic acids, for example divinyl adipate or divinyl succinate; divinyl ethers; diallyl ethers; allyl esters of polybasic acids such as triallyl cyanurate, diallyl fumarate or diallyl maleate; or after-reactive crosslinking agents such as allyl glycidyl ether, glycidyl acrylate, glycidyl methacrylate, glycidyl vinyl ethers or like compounds; also N-methylol compounds such as N-methylol-(meth)-acrylamide and the corresponding alkyl ethers, in lesser quantities of up to 10 % by weight, based on the vinyl ester or mixture of vinyl esters used, in the continuous process according to the invention without any adverse effect upon the characteristic stability of the dispersions obtained by this process.

Catalyst systems suitable for carrying out the continuous polymerisation reaction according to the invention include various peroxide compounds which form free radicals such as, for example, hydrogen peroxide, organic peroxides such as t-butylhydroperoxide, persulphates such as ammonium, sodium or potassium persulphate, or percarbonates. It is also possible to use combined catalysts containing both a peroxide compound and a reducing agent in the process according to the invention. Combined catalyst systems of this kind are generally referred to as "redox systems".

In addition to the aforementioned peroxide compounds, it is also possible to use, for example, sodium sulphite, sodium bisulphite, sodium pyrosulphite, sodium formaldehyde sulphoxylate, zinc formaldehyde sulphoxylate or the sodium salt of formamidine sulphinic acid as reducing agents. Other catalysts such as, for example, water-soluble bisazo compounds which form free radicals, can also be used in accordance with the process of the invention.

The catalyst system preferably used for carrying out the process according to the invention is an ammonium or alkali persulphate, optionally in combination with a reducing agent such as, for example, sodium pyrosulphite or sodium formaldhyde sulphoxylate.

The catalyst is used in a quantity of from 0.05 to 2.0 % by weight and preferably in a quantity of from 0.1 to 1.0 % by weight, based on the weight of the water used. In cases where one of the aforementioned reducing agents is also employed, the reducing agent is used in quantities of from 10 to 100 %, based on the weight of the peroxide compound used.

The reaction temperature at which the process according to the invention is carried out is governed by the particular type of catalyst system used. Whereas in cases where peroxide compounds alone are used, the reaction is carried out at a temperature of from 50° to 90°C, the reaction temperature in cases where peroxide compounds and reducing agents are simultaneously used ("redox catayst system") is in the range of from 0° to 60°C.

The buffer system employed is used to keep the pH value at the required level of from pH, 3.0 to 7.0 during the process according to the invention. It is possible for this purpose to use any alkali material such as, for example, mixtures of ammonium or alkali salts of primary or secondary phosphates, primary or neutral carbonates, borax or urea optionally in admixture with weak acids such as, for example, acetic acid or citric acid.

The buffer is used in such a quantity that the pH-value falls within the required range. The buffer is generally used in a quantity of from 0.1 to 1.5% by weight based on the weight of the water used.

The emulsifiers suitable for preparing the emulsifier system used in the process according to the invention belong to the group of anionic emulsifiers. This group includes on the one hand the known alkali and ammonium salts of sulphonates and isethionates corresponding to the general formula

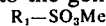

and $R_2-(O-CH_2-CH_2)_n-O-CH_2-CH_2-SO_3Me$ in which $R_1$ and $R_2$ is a linear or branched alkyl radical with from 10 to 18 carbon atoms, or a corresponding alkyl benzene radical, $n$ is an integer from 0 to 10 and Me is an ammonium or alkali metal radical; on the other hand, it is also possible to use the known ammonium or alkali metal salts of alcohol, alkylphenol or alkylnaphthol polyoxethyl sulphates corresponding to the general formula $R_3-(OCH_2-CH_2)_n-OSO_3Me$ in which $R_3$ is a radical derived from a linear or branched alkanol, a corresponding alkylphenol or a naphthol, $n$ is an integer from 1 to 10 and Me again represents an ammonium or alkali metal radical.

It is also possible to use the ammonium or alkali salts of dialkyl esters of sulphosuccinic acid and mixtures of the aforementioned anionic emulsifiers for carrying out the process according to the invention without any adverse effect upon the stability of the continuously removed concentrated dispersions of the copolymers formed.

The total quantity in which the anionic emulsifier employed is used for carrying out the process according to the invention is from 0.3 to 3.0 %, based on the weight of the water used. Although it is possible to use a larger quantity of anionic emulsifier, the resistance to water of a polymer film obtained by drying from the dispersion according to the invention gradually deteriorates in this case without any change in the stability of the dispersion obtained. Although a non-ionic emulsifier can be safely used in carrying out the process according to the invention, the maximum quantity of emulsifier specified above should not be exceeded in that case either.

An individual autoclave or a cascade of any number of autoclaves, preferably from 2 to 6, may be used as the reaction system in the process according to the invention. Mixing is achieved by stirring or other suitable measurers, such as shaking or rolling. The ratio of reactor length to reactor diameter is generally from 2 : 1 to 20 : 1. In cases where a reaction system of the stirrer-type autoclave is used, the reaction volume of individual autoclaves or of all the autoclaves can be divided up into a number of individual compartments, preferably from 2 to 6 compartments, by installing suitable partition plates.

In cases where several reactors are assembled into a cascade for carrying out the process according to the invention, the monomers and aqueous phase can be introduced both as a main stream into the first reactor and in the form of several branch streams into all, or some of the reactors used. However, it is preferred to apply the branch-stream principle in order to dissipate the heat of reaction uniformly.

The reaction system is kept at a reaction temperature of from 10° to 90°C by tempering. The reaction pressure of from 5 to 120 atms. of ethylene applied in the process according to the invention does not affect the extraordinary stability of the dispersions obtained, but merely displaces the composition of the polymer.

The reaction pressure applied preferably amounts to from 15 to 60 atms. of ethylene, in which case the polymer formed contains from 10 to 45 % by weight of ethylene. For economic reasons, the average residence time in the continuous process according to the invention is generally selected in such a way that a polymerisation yield of from 85 to 99.5 %, based on vinyl ester used, is obtained, although the process can also be carried out with a vinyl ester yield of from 60 to 85 % without any disadvantages with respect to the stability of the dispersions obtained. An average residence time, given by

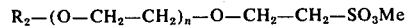

of from 3 to 12 hours, based on each of the autoclaves used, can be regarded as characteristic of the process according to the invention.

The ratio of total aqueous phase to vinyl ester phase is selected in such a way that the total solids content of the dispersion formed is from 45 to 65 % by weight and preferably from 50 to 65 % by weight.

The quantity of ethylene required for carrying out the process according to the invention is such that, in addition to the ethylene required for the polymerization reaction, an excess of from 2 to 50 % by weight, preferably from 4 to 25 % by weight, based on the ethylene used, is left over. This ensures that the pressure settling in the reactor is caused by a certain excess of ethylene. In the process according to the invention, both the dispersion formed and also the unreacted, dissolved and gaseous monomers are removed through a suitable discharging system. In this respect, precautions should be taken to ensure that a filling level, given by

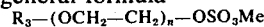

of from 50 to 99.9 % and preferably from 65 to 99.9 %, based on the particular autoclave volume, is maintained in each of the autoclaves used.

The average particle size of the polydisperse emulsion obtained can be influenced both by the quantity and by the type of emulsifier or emulsifiers used. Average particle sizes of from 100 to 450 mu can be regarded as characteristic of the process according to the invention. It is also characteristic of the invention that there is no displacement of the average particle size towards larger particle diameters during, for example, 300 average residence times.

In cases where it is desired to produce dispersions with average particle sizes of greater than 450 mu by the process according to the invention, it is necessary to use electrolytes, alcohols or protective colloids in the aqueous phase. In cases where protective colloids such as, for example, polyvinyl alcohol, methyl cellulose or hydroxyethyl cellulose, are used, the dispersion obtained undergoes an increase in viscosity, depending upon the molecular weight and quantity of the protective colloid used, to 50 – 5000 cP (based on a dispersion with a solids content of 50 %) in relation to a dispersion obtained without a protective colloid, in which case the viscosity amounts is from 8 to 50 cP (based on a dispersion with a solids content of 50 %).

The dispersions obtained by the continuous process according to the invention have a total solids content of from 45 to 65 % by weight, preferably from 50 to 65 % by weight, are surprisingly stable in storage in contrast to dispersions prepared correspondingly by a batch process, and show no signs of creaming after storage for a period of 12 months.

This is explained by the fact that, surprisingly, the monomeric sulphonate used is incorporated into the polymer chain of the vinyl ester/ethylene polymer formed in the continuous process according to the invention, and no water-soluble polymers containing hydrophilic groups, which act as creaming agents, are formed.

Evaporation of the water from the dispersions obtained by the process according to the invention with glass transition temperatures of the copolymers $T_g$ of + 20°C to 25°C results in the formation of flexible polymer films which are distinguished by extremely high stability to light, resistance to water and resistance to hydrolysis.

The dispersions obtained can be used as pigment binders, for example in dispersions of the kind used to protect buildings and in coating compositions of the kind used, for example, for coating paper and carpet backings, because they combine a sufficiently low glass transition temperature with an ideal compatibility with the particular pigments and other additives used, in addition to which the copolymer adheres surprisingly firmly to the various pigments used.

The polymer films obtained following evaporation of the water from the dispersions obtained by the process according to the invention are characterized not only by the properties referred to above but also by their particularly high gloss level, which is entirely comparable with that of corresponding polymer films obtained after dissolving the isolated polymer in toluene. This is explained by the fact that the process according to the invention results in the formation of dispersions with relatively small average particle sizes which, in addition, show a polydispersity of particle diameter that is favourable for producing high-gloss polymer films, so that a particularly high packing density of the polymer and a correspondingly particularly uniformly coherent surface of the kind that would otherwise only be observed in the production of films from a solution, are obtained before the last traces of water are evaporated off.

The aforementioned disadvantages affecting batch processes do not arise because the reactor is only filled once in, for example, 1000 hours or longer, the reactor walls do not become coated during the aforementioned period in the process according to the invention, the ethylene is introduced continuously at a rate commensurate with that at which it is consumed, the reactor is always kept at the requisite reaction temperature and discharge takes place continuously throughout the entire production time.

The monomer units incorporated in the polymers are present in a substantially statistical distribution.

The continuous process according to the invention is illustrated in, but by no means limited to the following Examples.

EXAMPLE 1

The reaction system used comprised a single, temperable, stirrer-type stainless-steel autoclave equipped with a temperature-measuring facility, inlets for continuous introduction of the starting materials and an outlet for removing the polymer dispersion formed. More particularly, the following streams were continuously introduced, an internal temperature of 75° ± 1°C being maintained by tempering, whilst, on the one hand, a working pressure of 45 ± 1 atm. of ethylene and, on the other hand, a filling level in the reactor 95 to 99.9% was maintained by correspondingly actuating the discharging system which was connected to the outlet pipe of the apparatus: an average residence time of about 7.6 hours was selected for carrying out the reaction:

Stream 1:
2440 g/h of the following aqueous solution:
36.0 g of the sodium salt of the sulphonic acid of a higher aliphatic hydrocarbon,
36.0 g of the sodium salt of 2-N-acrylamido-2-methyl propane sulphonic acid,
7.20 g of potassium peroxy disulphate,
4.80 g of sodium carbonate, and
2356 g of deionised water;
Stream 2: 2200 g/h of vinyl acetate;
Stream 3: 900 g/h of ethylene.

After the reaction conditions had been left to stabilise for 24 hours (3 average residence times), 53,400 g of the following dispersion, characteristic of this Example, and 2030 g of exhaust gas consisting of 81% by volume of ethylene and of 19% by volume of vinyl acetate were subsequently obtained every 10 hours without any signs of coagulate formation over a period of 800 hours:

Analytical data to the dispersion obtained:

| | |
|---|---|
| Total solids content: | 55.4 ± 0.4% by weight |
| pH-value: | 5.35 ± 0.10 |
| Vinyl acetate content (film): | 69.5 ± 0.5% by weight |
| nitrogen (coagulate): | 0.07 ± 0.01% by weight[1] |

[1]After dilution of the dispersion with deionised water in a ratio by weight of 1 : 1, the copolymer was isolated by low temperature coagulation (−78°C) and the N-content was determined by elemental analysis after -continued careful washing (sulphate-free) with deionised water and drying at 30°C/15 mm Hg.

Particle size: Determination of the average particle size at intervals of 24 hours produced a value d of 210 ± 10 mµ over the total production time.

Nitrogen analysis of the polymer isolated by low-temperature coagulation with 0.14 % by weight of N shows that the monomeric sulphonate used is incorporated almost quantitatively into the water-insoluble vinyl acetate/ethylene polymer formed.

Characteristic stability data of the dispersion obtained:

Microcoagulate content

Testing of a polymer film produced with a 30µ doctor showed that the dispersion obtained was completely free from microcoagulate particles (specks) both before and after drying of the film (magnified 10 times).

Electrolyte stability

The dispersion could be diluted as required with 10% $CaCl_2$ solution and 10% $Al_2(SO_4)_3$ solution without any signs of coagulate formation.

Shear-force stability

The dispersion did not show any signs of microcoagulate formation (specks) after stirring for 30 minutes with a Kaixon stirrer (14,000 r.p.m., 20 mm diameter).

Stability in storage 5 kg of the dispersion obtained were stored for 52 weeks in a cylindrical vessel in the form of a 30 cm tall column of liquid. Samples taken at 4-week intervals at distances of 0.5, 5, 10, 15, 20, 25 and 29.5 cm from the upper liquid level did not show any change from the initial concentration throughout the entire period.

The present Example could also be carried out, without any changes in the characteristic stability data quoted, with alkali metal or ammonium salts of:

2-N-methacrylamido-2-methyl propane sulphonic acid,
2-N-(meth)-acrylamido ethane sulphonic acid,
2-(meth)-acryloyl ethane sulphonic acid,
3-(meth)-acryloyl propane sulphonic acid,
4-(meth)-acryloyl butene sulphonic acid etc.
in quantities of from 0.5 to 15 % by weight, based on the weight of the water used, and under working pressures of from 5 to 120 atms. of ethylene over average residence times of from 3 to 12 hours and with reactor filling levels of from 50 to 99.9 %, in such a way that the dispersions had total solids contents of from 45 to 65 % by weight.

Pigment-binder properties of the dispersion obtained

The following pigments were successively added while stirring with a turbine stirrer to a mixture of 1476 g of deionised water and 6 g of concentrated ammonia:
1333.4 g of china clay
500 g of blanc fixe
833 g of satin white dispersion (20 % by weight in water).

On completion of the addition, stirring was continued at high speed for a further 20 minutes in order to disperse the pigments completely. 690 g of a casein solution prepared as follows were then added with slow stirring:

134 g of casein were added while stirring at approximately 25°C to a mixture of 536 g of deionised water and 20 g of concentrated ammonia. This was followed by heating to 70°C, after which the mixture was stirred at this temperature for a period of 15 minutes. On completion of dissolution, the product was cooled to 25°C.

The pigment paste thus obtained was left for 12 hours at 25°C to settle and air.

137 g of the polymer dispersion prepared in accordance with this Example, adjusted beforehand to a total solids content of 50.0 % by weight by dilution with deionised water, were then added with slow stirring to 1250 g of the pigment paste.

Pigment compatibility

To test the pigment compatibility of the dispersion, the change in the viscosity of the coating composition produced was measured at intervals of 20 hours as the flowout time from a DIN-cup (4 mm orifice). No change in the initial flowout time of 13.5 ± 0.2 seconds was observed over a period of 40 hours, indicating high pigment compatibility of the dispersion obtained.

Pigment-binding capacity

In a paper coating machine, a wood-free sized and coated raw paper weighing 60 g/m² was coated with the coating composition obtained at machine speeds of from 10 to 250 m/min. and the coating was equalised with an air brush. The coated and equalised sheet of paper was then dried with hot air in a tunnel dryer (approximately 120°C). The coating was applied to one side only in a weight of 20 g/m² (air dry).

The paper obtained was then satinised under a contact pressure of 90 kp/cm² in an ultragloss calender. To test pigment-binding capacity, the coated paper thus produced, having first been conditioned for 24 hours at 65 % relative air humidity/20°C, was testted in an IGT A 2 printability tester using a 10 mm-wide pressure roller and a contact pressure of 35 kp/cm², to determine the picking strength of the paper coating. With a picking oil consisting of 80 parts by weight of $^{(R)}$NUSO 250 N (viscosity approximately 290P) and
20 parts by weight of $^{(R)}$ NUSO 500 N (viscosity approximately 500P),
a picking strength of 60 cm/second was measured, indicating an extremely high pigment-binding capacity of the dispersion obtained in accordance with this Example. $^{(R)}$ NUSO 250 N and $^{(R)}$ NUSO 500 N = commercial product of Messrs. Humble Oil & Refining Co. in June 1972.

EXAMPLE 2

Example 1 was repeated with the difference that the following streams:
Stream 1:
2440 g/h of the following aqueous solution
18 g of sodium lauryl sulphate,
108 g of the sodium salt of 2-N-methacrylamido-2-methyl propane sulphonic acid,
15 g of potassium peroxydisulphate,
15 g of borax and
2284 g of deionised water;
Stream 2: 2200 g/h of vinylacetate;
Stream 3: 450 g/h of ethylene, were introduced, the working pressure amounting to 20 ± 1 atm. of ethylene and the average residence time to approximately 4.3 hours. 48,250 g of the following dispersion and 2620 g of exhaust gas consisting of 71 % by volume of ethylene and 29 % by volume of vinylacetate, were obtained every 10 hours:

Analytical data of the dispersion obtained

| | |
|---|---|
| Total solids content: | 51.2 ± 0.5 % by weight |
| pH-value: | 5.50 ± 0.2 |
| vinylacetate content (film): | 81.3 ± 0.5 % by weight |
| nitrogen (coagulate): | 0.24 ± 0.1 % by weight (cf. 1) |
| particle size: | 320 ± m$\mu$ |

The characteristic stability data of the dispersion obtained are entirely consistent with the data quoted in Example 1.

Pigment-binder properties of the dispersion obtained

A pigmented coating composition was prepared with the dispersion obtained in accordance with Example 2 by the same procedure as described in Example 1.

Pigment compatibility

As in Example 1, the coating composition was tested for changes in viscosity at intervals of 20 hours. Once again, no change in the initial flowout time of 14.2 ± 0.2 seconds was observed over a period of 40 hours, indicating a high pigment compatibility of the dispersion obtained in accordance with Example 2.

Pigment-binding capacity

The pigment-binding capacity of the dispersion obtained in this Example was determined in accordance with the procedure described in Example 1. A picking strength of 48 cm/second was measured, indicating a high pigment-binding capacity of the dispersion obtained in accordance with Example 2.

EXAMPLE 3

Example 1 was repeated with the difference that the reaction system used was in the form of a reactor cascade comprising two temperable stainless-steel stirrer-type autoclaves of the kind used in Example 1, the outlet of autoclave 1 being connected to the inlet of autoclave 2. During the reaction, the internal temperature in autoclave 1 was kept at 70° ± 1°C and the internal temperature in autoclave 2 at 75° ± 1°C, the discharge system connected to the outlet of autoclave 2 being actuated in such a way that, on the one hand, a working pressure of 45 ± 1 atm. of ethylene and, on the other hand, filling levels of from 95 to 99.9 % were maintained in the autoclaves. At the same time, a total average residence time of 15 hours was selected for carrying out the reaction. The following streams were introduced into the inlet of autoclave 1:

Stream 1:
2385 g/h of the following aqueous solution:
45 g of the sodium salt of the dihexylester of sulphosuccinic acid,
45 g of the potassium salt of 2-N-acrylamido-2-methyl propane sulphonic acid,
9.0 g of potassium peroxy disulphate,
6.0 g of sodium hydrogen carbonate,
2280 g of deionised water;
Stream 2:
1900 g/h of vinylacetate;
Stream 3:
1200 g/h of ethylene.

53,350 g of the following dispersion and 1,620 g of exhaust gas, consisting of 75 % by volume of ethylene and 25 % by volume of vinylacetate, were obtained every 10 hours.

Analytical data of the dispersion obtained:

| | |
|---|---|
| Total solids content: | 56.5 ± 0.2 % by weight |
| pH-value: | 6.20 ± 0.05 |
| vinyl acetate content (film): | 59.0 ± 0.2 |
| nitrogen (coagulate): | 0.08 ± 0.01 |
| particle size: | 300 ± 20 m$\mu$ |

The characteristic stability data of the dispersion obtained were entirely consistent with the data quoted in Example 1.

In the present Example, up to 50 % by weight of the vinyl acetate used could be replaced by vinyl propionate, vinyl laurate, vinyl stearate or vinyl chloride without any adverse effect upon the characteristic stability data of the dispersions obtained.

Pigment binder properties of the dispersion obtained

A pigmented coating composition was prepared with the dispersion obtained in Example 3 in accordance with the procedure described in Example 1.

Pigment compatability

As in Example 1, the coating composition was tested every 20 hours for changes in viscosity. No change in the initial flowout time of 13.7 ± 0.3 seconds was observed over a period of 40 hours, which again indicated a high level of pigment compatability in the dispersion obtained in accordance with the present Example.

Pigment binding capacity

The pigment binding capacity of the dispersion obtained in accordance with Example 3 was determined in accordance with the procedure described in Example 1. A picking strength of 57 cm/second was measured, again indicating an extremely high pigment binding capacity of the dispersion obtained in accordance with the present Example.

COMPARISON EXAMPLE 1

The following components were introduced into a temperable 40 liter capacity stirrer-type autoclave of stainless-steel equipped in the same way as in Example 1.

40 g of the sodium salt of the sulphonic acid of a higher aliphatic hydrocarbon,
23 g of the sodium salt of 2-N-acrylamido-2-methyl propane sulphonic acid,
20 g of potassium persulphate,
20 g of sodium carbonate,
25 g of glacial acetic acid, and
8800 g of deionised water.

After the autoclave has been evacuated and vented with nitrogen 3 times, 35 atms. of ethylene were introduced at 25°C, followed by the addition of 1000 g of vinylacetate. After heating to 75°C, the working pressure of 45 atms. of ethylene was adjusted and the contents of the autoclave were held for 30 minutes at 75°C. The following streams were then introduced linearly over a period of 8.00 hours during which the reaction temperature was kept at 75°C and the working pressure at 44 ± 1 atm. of ethylene by the introduction under pressure of more ethylene.

Stream 1:
1036 g/h of the following aqueous phase:
200 g of the sodium salt of the sulphonic acid of a higher aliphatic hydrocarbon,
297 g of the sodium salt of 2-N-acrylamido-2-methyl propane sulphonic acid,
62 g of potassium peroxy disulphate,
29 g of sodium carbonate, and
7700 g of deionised water;
Stream 2:
1800 g/h of vinyl acetate.

On comletion of the addition, the contents of the autoclave were left for 1 hour at 75°C, subsequently cooled to 50°C and restored to normal pressure over a period of 4 hours by letting off the excess ethylene. 35,800 g of the following dispersion were obtained together with 800 g of coagulate:

Analytical data of the dispersion obtained:

| | | |
|---|---|---|
| Total solids content: | 54.5 | % by weight |
| pH-value: | 5.40 | |
| vinyl acetate content (film): | 69.3 | % by weight |
| nitrogen (coagulate): | <0.01 | % by weight |
| particle size: | 220 | mµ |

For nitrogen analysis, 300 g of the dispersion were diluted with 300 g of deionised water and subjected to low temperature coagulation (− 78°C). The coagulate was washed free from sulphate with a total of 5000 g of deionised water and was dried at 30°C/15 mm Hg (yield 153.5 g of coagulate, <0.01 % of N).

Evaporation of the washing water, ultimately at 45°C/0.01 mm Hg, left 10.03 g of a pale yellow viscous grease containing 1.61 % of N in which it was not possible to detect any double bonds by bromination or hydrogenation.

Analyses showed that the monomeric sulphonate used was polymerised almost quantitatively into water-soluble products and was not incorporated into the vinyl acetate/ethylene copolymer formed.

Characteristic stability data of the dispersion obtained

Microcoagulate content

Testing of a polymer film (magnified 10 times) prepared with a 30 µ doctor did not show any microcoagulate particles (specks) in the dispersion obtained.

Electrolyte stability

The addition of 0.4 cc of a 10 % CaCl$_2$ solution or of 0.1 cc of a 10 % Al$_2$(SO$_4$)$_3$ solution to 20 g of the dispersion produced coagulation.

Shear-force stability

14 % by weight of the polymer present in the dispersion were coagulated after stirring for 6 minutes with a Klaxon stirrer (14,000 r.p.m. diamter 20 mm). the residue showing numerous specks.

Stability in storage 5 kg of the dispersion were stored for 12 weeks in the form of a 30 cm tall column of liquid in a cylindrical vessel. Samples taken at four-week intervals at distances of 0.5, 5, 10, 15, 20, 25 and 29.5 cm from the upper liquid level, had the following total solids concentrations shown in Table 1:

TABLE 1

| Stability in storage Comparison Example 1 | 0 weeks | 4 weeks | 8 weeks | 12 weeks |
|---|---|---|---|---|
| Total solids content (% by weight) at a distance of | | | | |
| 0.5 cm | 54.5 | 22.8 | 12.7 | 6.8 |
| 5 cm | 54.5 | 43.8 | 24.7 | 12.8 |
| 10 cm | 54.5 | 63.0 | 67.8 | 69.1 |
| 15 cm | 54.5 | 53.8 | 68.0 | 69.6 |
| 20 cm | 54.5 | 64.1 | 68.0 | 69.7 |
| 25 cm | 54.5 | 64.2 | 68.0 | 69.8 |
| 29.5 cm | 54.5 | 64.3 | 68.2 | 69.8 |
| from the upper liquid level | | | | |

Pigment binder properties of the dispersion obtained:

A pigmented coating composition was prepared with the dispersion obtained in accordance with Comparison Example 1 by the procedure described in Example 1.

Pigment compatibility

As in Example 1, the coating composition was tested at intervals of 20 hours for changes in viscosity. The following results were obtained:

| | |
|---|---|
| initial flowout time: | 17.8 seconds |
| flowout time after 20 hours: | completely thickened |

Pigment binding capacity

The pigment binding capacity of the dispersion obtained in accordance with Comparison Example 1 was determined by the procedure described in Example 1. A picking strength of 33 cm/second was measured.

Both the totally inadequate pigment compatibility and also the excessively low pigment binding capacity for the dispersion obtained in accordance with Comparison Example 1 prevent it from being used as pigment binder. In addition, the instability in storage of the dispersion obtained in accordance with Comparison Example 1 makes it unsuitable for other technical applications.

COMPARISON EXAMPLE 2

Example 1 was repeated with the difference that the following streams were introduced:
Stream 1:
2404 g/h of the following aqueous solution:
36.0 g of the sodium salt of the sulphonic acid of a higher aliphatic hydrocarbon,
7.20 g of potassium peroxy disulphate,
4.80 g of sodium carbonate, and
2356 g of deionised water;
Stream 2:
2200 g/h of vinyl acetate; Stream 3:
900 g/h of ethylene.

The working pressure, reaction temperature, reactor filling level and average residence time were the same as in Example 1.

51,050 g of the following dispersion and 4000 g of exhaust gas consisting of 70 % by volume of ethylene and 30 % by volume of vinyl acetate were obtained every 10 hours:

Analytical data of the dispersion obtained:

| | |
|---|---|
| Total solids content: | 49.7 ± 0.8 % by weight |
| pH-value: | 5.40 ± 0.2 |
| vinyl acetate content (film): | 69.2 ± 0.5 % by weight |

Characteristic stability data of the dispersion obtained:

Microcoagulate content

Testing of a copolymer film prepared with a 30μ doctor showed that the dispersion obtained contained an extremely large number of microcoagulate particles (specks) over the entire field of observation. Accordingly, it was not possible to determine the particle size.

Electrolyte stability

The addition of 0.1 cc of a 10 % $CaCl_2$ solution or of 0.1 cc of a 10 % $Al_2(SO_4)_3$ - solution to 20 g of the dispersion produced coagulation.

Shear-force stability

92 % of the copolymer present in the dispersion had coagulated after stirring for 35 seconds with a Klaxon stirrer (14,000 r.p.m., diameter 20 mm).

Stability in storage

After 5 kg of the dispersion had been stored for four weeks in the form of a 30 cm tall column of liquid, 830 g of a slimy sludge, which could only be partly redispersed with water, had settled on the bottom of the vessel.

Pigment binder properties of the dispersion obtained:

Pigment compatibility

When the dispersion obtained in accordance with the present Example was added to a pigment-casein paste prepared in accordance with Example 1, a steady increase in the viscosity of the coating composition was observed parallel to the progressive addition of 137 g of the polymer dispersion. After 100 g of the dispersion had been added, the coating composition thickened completely into a mass which could no longer be stirred.

The pigment incompatibility observed made it impossible to use the dispersion obtained in accordance with this Example as a pigment binder, in addition to which the totally inadequate stability data of the dispersion obtained precluded its use in other technical applications.

We claim:

1. The composition consisting essentially of a storage stable aqueous copolymer dispersion having a solids content of from 45 to 65% by weight and prepared by the process consisting essentially of continuously introducing ethylene, a vinyl ester selected from the group consisting of vinyl acetate, vinyl propionate, vinyl laurate, vinyl stearate and mixtures thereof and an aqueous phase in a ratio by weight of vinyl ester to ethylene of from 100:2 to 100:250 and a weight ratio of vinyl ester to aqueous phase of from 3:1 to 0.3:1, into a reaction zone maintained at a temperature of from 0° to 90°C. and under an ethylene pressure of from 5 to 120 atmospheres and at a pH of from 3 to 7 for an average residence time of from 3 to 12 hrs. and continuously removing said aqueous copolymer dispersion together with unreacted monomers from said reaction zone, said aqueous phase containing a catalytic amount of a free radical catalyst and from 0.3 to 3% by weight, based on the weight of water in said aqueous phase, of an anionic emulsifier and from 0.1 to 15% by weight, based on the weight of water in said aqueous phase, of a compound of the formula

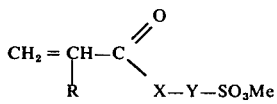

wherein R is hydrogen or methyl, X is —O—, —NH— or

having 1 to 6 carbon atoms, Y is ethylene having 2 to 10 carbon atoms and Me is an ammonium or alkali metal radical.

2. The composition of claim 1 wherein said vinyl ester is vinyl acetate and an ammonium or alkali metal salt of 2-N-acrylamido-2-methyl propane sulfonic acid is the compound of said formula.

3. The composition of claim 1 wherein said vinyl ester is vinyl acetate and an ammonium or alkali metal salt of 2-N-methacrylamido-2-methyl propane sulfonic acid is the compound of said formula.

* * * * *